May 2, 1950   J. G. DAY   2,506,349
BOX HOOK
Filed Jan. 10, 1947
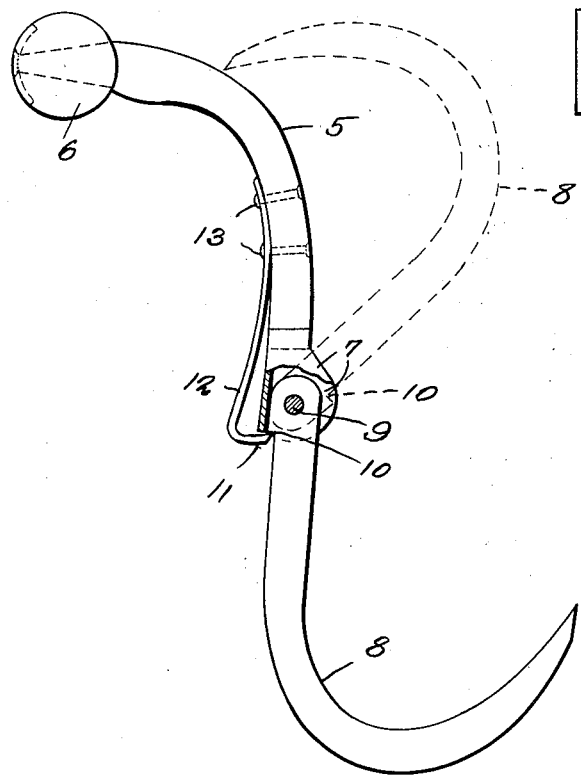
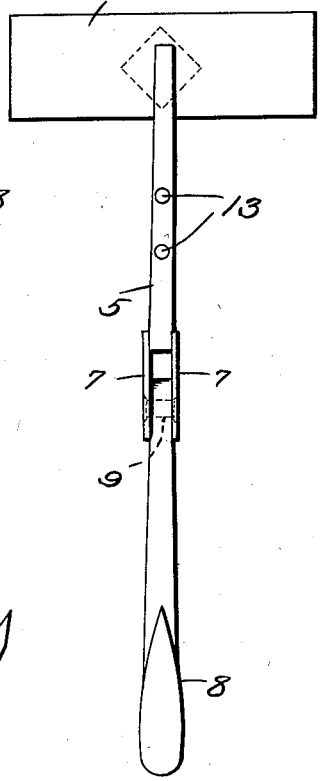
John G. Day
INVENTOR
BY C. A. Snow & Co.
ATTORNEYS.

Patented May 2, 1950

2,506,349

UNITED STATES PATENT OFFICE 2,506,349

BOX HOOK

John G. Day, Seattle, Wash.

Application January 10, 1947, Serial No. 721,287

1 Claim. (Cl. 294—26)

This invention relates to box hooks designed primarily for use by longshoremen, shipping clerks or the like, wherein hooks are used in lifting boxes, bales of materials, or the like.

The primary object of the invention is to provide a box or bale hook including a handle or supporting section, and a pivoted hook section, the hook section being so constructed and arranged that it will swing upwardly to a position adjacent to the handle or support, guarding the sharp pointed end of the hook to prevent persons from injury by the pointed end of the hook, when the hook is not in use and being carried in the pocket.

Still another object of the invention is to provide a box or bale hook wherein the hook section will be held in its inactive position when not in use, to prevent the hook from becoming exposed.

Still another object of the invention is to design the hook in such a way that the hook may be conveniently operated to accomplish its purpose.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing:

Figure 1 is a side elevational view of a box or bale hook, constructed in accordance with the invention, the hook being shown in its open or extended position for use.

Figure 2 is a front elevational view thereof.

Referring to the drawing in detail, the hook comprises a curved handle section 5, which is provided with the usual cross-handle 6, by means of which the hook may be conveniently held while in use.

Welded to the outer end of the handle section 5, are spaced flanges 7 that extend beyond the end of the section 5, the flanges providing a support for the hook 8 which is shown as mounted on the pin 9 that extends between the flanges 7, as clearly shown by Figure 1 of the drawing. Adjacent to the pivoted end of the hook 8, and disposed on the rear edge thereof, is the shoulder 10 against which the end 11 of the spring arm 12 engages, thereby holding the hook 8 in its extended position. The spring arm 12 is secured to the rear curved edge of the section 5, as by means of rivets 13.

It will be seen from viewing Figure 1 of the drawing, that the hook 8 is curved in a direction opposite to the curvature of the handle or section 5, with the result that when the hook 8 is swung upwardly to its inactive position as shown by dotted lines in Figure 1 of the drawing, the pointed end of the hook will engage the curved surface of the handle section 5, protecting persons using the hook, against injury when the hook is folded and carried in the pocket of the user.

When it is desired to use the hook, the hook end 8 is swung from the dotted line position as shown by Figure 1 of the drawing, to the full line position, where the spring arm 12 acts to secure the hook in its extended position, the hook being released only by moving the spring arm 12 to a position to disengage the shoulder 10.

Having thus described the invention, what is claimed is:

A box and bale hook comprising a handle section, spaced flange members formed on one end of the handle section, a hook section pivotally mounted between the flange members, a spring arm secured to the handle section and operating between the flange members, a right angled end on the spring arm normally contacting the hook section holding the hook section against movement when in use, a shoulder formed on the hook section with which the right angled end of the spring arm contacts, restricting movement of the hook section with respect to the handle section, and said spring arm operating to hold the hook section folded against the handle section when the hook section is closed against the handle section.

JOHN G. DAY.

REFERENCES CITED

The following references are of record in the file of this patent:

UNITED STATES PATENTS

| Number | Name | Date |
|---|---|---|
| 782,302 | Williams | Feb. 14, 1905 |
| 1,640,102 | Valliere | Aug. 23, 1927 |
| 2,214,660 | Darling | Sept. 10, 1940 |